United States Patent
Jung et al.

(10) Patent No.: US 7,646,186 B2
(45) Date of Patent: Jan. 12, 2010

(54) HOLDOVER CIRCUIT FOR A POWER CONVERTER USING A BI-DIRECTIONAL SWITCHING REGULATOR

(75) Inventors: Edward Jung, Dallas, TX (US); Paul David Aloisi, Merrimack, NH (US); James G. Bird, Mont Vernon, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/141,512

(22) Filed: May 31, 2005

(65) Prior Publication Data

US 2005/0281057 A1 Dec. 22, 2005

Related U.S. Application Data

(60) Provisional application No. 60/582,353, filed on Jun. 22, 2004.

(51) Int. Cl.
*G05F 1/70* (2006.01)
*G05F 3/00* (2006.01)
*G05F 5/00* (2006.01)
(52) U.S. Cl. ................... 323/284; 323/222; 323/286; 323/271; 323/207
(58) Field of Classification Search .......... 323/222, 323/282, 284, 286, 271, 207
See application file for complete search history.

(56) References Cited

U.S. PATENT DOCUMENTS 4,168,477 A * 9/1979 Burchall .............. 323/222
5,115,185 A * 5/1992 Fraidlin et al. ........ 323/207
5,258,901 A * 11/1993 Fraidlin ................ 363/15

(Continued)

OTHER PUBLICATIONS

Author Unknown, "Hold-Up Solution 16-40V & 9-36V DC/DC Converter Compatible Metallic Case," Manufacturer Data Sheet for Hi-Rel Hold-Up Module HUGD-50: 50W Power, AIA Converter, 2003, pp. 1-7.

*Primary Examiner*—Bao Q Vu
(74) *Attorney, Agent, or Firm*—Mirna Abyad; Wade J. Brady, III; Frederick J. Telecky, Jr.

(57) ABSTRACT

A holdover circuit is configured with a holdover capacitor, preferably an aluminum electrolytic capacitor, to provide uninterruptible operation for an electrical load operable over a limited range of input voltage during brief power interruptions. The holdover circuit includes a switching regulator configured with two active switches that are controlled with complementary duty cycles to charge and discharge the holdover capacitor at a voltage higher than the voltage of the load. The controller for the switching regulator may be configured to regulate the voltage of the holdover capacitor at a voltage proportional to the load voltage or at a constant voltage. The controller for the switching regulator is configured to operate in different modes during normal powered operation and during holdover.

18 Claims, 6 Drawing Sheets

U.S. PATENT DOCUMENTS

| | | | |
|---|---|---|---|
| 5,619,404 A * | 4/1997 | Zak | 363/21.09 |
| 5,631,814 A * | 5/1997 | Zak | 363/37 |
| 5,642,267 A * | 6/1997 | Brkovic et al. | 363/16 |
| 5,909,360 A * | 6/1999 | Lavin et al. | 307/66 |
| 6,011,382 A * | 1/2000 | Littlefield et al. | 323/222 |
| 6,043,705 A * | 3/2000 | Jiang | 327/589 |
| 6,529,389 B2 * | 3/2003 | Perlick et al. | 363/20 |
| 6,697,955 B1 * | 2/2004 | Malik et al. | 713/340 |
| 6,781,351 B2 * | 8/2004 | Mednik et al. | 323/222 |
| 6,788,557 B2 * | 9/2004 | Phadke | 363/21.16 |
| 6,831,449 B2 * | 12/2004 | Nishida et al. | 323/284 |
| 6,882,552 B2 * | 4/2005 | Telefus et al. | 363/97 |
| 6,960,901 B2 * | 11/2005 | Wu et al. | 323/222 |
| 7,023,186 B2 * | 4/2006 | Yan | 323/225 |

* cited by examiner

HOLDOVER CIRCUIT FOR A POWER CONVERTER USING A BI-DIRECTIONAL SWITCHING REGULATOR

CROSS REFERENCE TO RELATED APPLICATIONS

This patent application claims the benefit under 35 U.S.C. 119 (e) of the earlier filed U.S. Provisional Application No. 60/582,353, filed Jun. 22, 2004, entitled "Novel Way to Reduce the Input Voltage Hold Up Capacitance in Systems That Must Operate Through a Momentary Power Loss," which is also incorporated herein by reference.

TECHNICAL FIELD

Embodiments of the present invention relate generally to using a bi-directional power converter and a method therefore to decrease the size of a required capacitor to provide a holdover time interval for an electrical load. Particular embodiments relate to using bi-directional switching regulators incorporating synchronous rectifiers to decrease the size of a required capacitor to provide a holdover time interval for an electrical load.

BACKGROUND

DC/DC converters and dc/ac inverters are used in electronic applications to provide regulated voltages or currents for specialized uninterruptible loads that may be required to be powered by a tightly regulated power source. Such converters and inverters generally operate from an electrical power source that in turn must provide a voltage that is required to lie between well-defined upper and lower voltage limits. For example, a power supply used in a telecommunications or similar application might be required to operate without interruption from a power source that supplies a voltage lying between 43 and 72 volts, and to operate at least for short periods of time for an input voltage as low as 36 volts. However, the power supply might also be required to provide normal output power even if the input voltage falls to zero for a period of time, for example, up to 5 ms. Such uninterruptible operation with no or very little input voltage is often referred to as "holdover," and usually requires the addition of capacitors of significant size to the circuit to provide the necessary holdover energy. Such holdover capacitors are usually coupled across the input to the power supply, and are partially discharged over the operating range of voltages for the power supply during periods of time when input power is not present.

The energy $E_S$ stored in a capacitor (whose capacitance does not change substantially with voltage) is proportional to its capacitance C and to the square of the capacitor voltage V:

$$E_S = 0.5 \cdot C \cdot V^2$$

If such a capacitor is discharged from an initial voltage $V_B$ to a final voltage $V_A$, the energy removed from the capacitor $E_R$ is given by the equation:

$$E_R = 0.5 \cdot C \cdot (V_B^2 - V_A^2)$$

Thus, the energy available for holdover is dependent on the range of voltage over which it is discharged.

Capacitors generally are not a volumetrically efficient means for energy storage. Among the various capacitor types, aluminum electrolytic capacitors generally are among the best in terms of stored energy density that can be efficiently withdrawn over relatively short intervals of time. The consequence of their low energy density is that a significant number of capacitors is required for the holdover function if there is a substantial power level such as 200 watts and a substantial holdover time such as 5 ms. For an application, for example, such as one with a 43-volt lower nominal input voltage limit and a short-term cut-off voltage of 36 volts, the required capacitance deduced from the equation above would be about 5600 microfarads, considering the typical 20% capacitance tolerance for aluminum electrolytic capacitors, discharged from an initial voltage of 43 volts, and including a voltage loss of perhaps 1.3 volts in isolation diodes that might be required in a practical circuit arrangement. This capacitance could be implemented with 56 capacitors, each rated at 100 microfarads, which would consume a substantial amount of board space, incur significant expense in fabricating a 200 watt power converter, and introduce reliability issues due the large number of additional circuit components required in the product design.

Various circuit arrangements have been used to implement a holdover scheme using a holdover capacitor coupled across the input to a power supply. An example of a prior art circuit as illustrated in FIG. 1 showing a load powered from an input voltage source 101 of 48volts with return current coupled to ground at the terminal gnd. A holdover capacitor $C_H$ is coupled across the input to the load through the switch $Q_{100}$. The load might be required to operate, for example, over a normal input voltage range of 43 to 72 volts and to operate for short periods, 5 ms., for example, down to an input voltage of 36 volts. The holdover circuit might be required to provide an input voltage to the load falling between the upper and lower voltage limits even if the input voltage "drops out" to zero volts for the 5 ms interval.

The holdover capacitor $C_H$ is pre-charged by a boost switching regulator to a voltage at the upper end of the normal operating voltage range for the load 120, and is coupled to the load during brief power interruptions by the switch $Q_{100}$, a p-channel FET. When the load voltage falls below a threshold voltage detected by the comparator 104 using the resistor divider formed by the resistors $R_4$ and $R_5$ and the reference voltage supplied from the $V_{REF}$ terminal of the PWM controller, then the switch $Q_{100}$ is enabled to conduct, and energy stored in the capacitor $C_H$ is supplied to the load. The resistor $R_6$ is included to limit the current surge that results from unequal initial voltages across the capacitors $C_H$ and $C_L$ when the switch $Q_{100}$ is closed, and also limits in-rush current to the capacitor $C_H$ when the circuit is first energized. Other in-rush control arrangements can be used such as the Texas Instruments TPS2393 controller. The holdover capacitor $C_H$ is thus able to power the load for a brief interval as it is discharged over the full normal operating voltage range for the load.

The capacitor $C_L$ is a by-pass capacitor for the load 120, and provides the initial holdover energy for the load. If the 48-volt source is momentarily disconnected, the voltage supplied to the load decreases as the capacitor $C_L$ is discharged.

Under normal operating conditions when the 48-volt source is powering the load, the capacitor $C_H$ is charged by the boost switching regulator comprised of the switch $Q_2$, illustrated in the figure as an n-channel FET, the inductor $L_1$, and the diode $D_1$. The PWM (pulse-width modulated) controller 110 generates a controlled duty-cycle signal for the gate of switch $Q_2$ at its GATE terminal through line 111 to regulate its voltage at the node 112 at the desired voltage level. If a semiconductor technology other than, for example, silicon FET technology is used to implement the switch $Q_2$ then a paralleling diode may be added in parallel with the switch as necessary if such diode is not already inherent in the switching device. The resistor divider comprised of resistors $R_1$ and $R_2$ provide the feedback signal to the PWM controller at its FB terminal. The ground terminal for the PWM controller is shown in the figure as the terminal GND. Bias voltage is provided to the PWM controller 110 at the $V_{DD}$ terminal through resistor $R_3$, which is by-passed to ground through the capacitor $C_1$. The design of boost switching regulators and PWM controllers is well known in the art, and further details such as feedback-stabilizing components are not illustrated and will not be discussed herein in the interest of brevity.

The circuit illustrated in FIG. 1 can discharge the holdover capacitor substantially over the full operating voltage range of the load and can achieve a modest decrease in the size of the holdover capacitor for a required holdover period and load level compared to a scheme in which the holdover capacitor is coupled directly across the input voltage source for the load. Nonetheless, it still has limitations because the voltage of the capacitor $C_H$, which is directly coupled to the load when it is discharged and which provides the principal portion of the holdover energy, cannot be charged to a voltage higher than the specified operating range for the load. Additionally, a significant fraction of the stored energy in the capacitor is not removed during its discharge. Further, the voltage to which the holdover capacitor is charged cannot be selected to take advantage of the voltage rating of commercially available capacitors. The circuit in FIG. 1 can transfer energy from the low voltage capacitor $C_L$ to the high voltage capacitor $C_H$, but not in the reverse direction. Thus, there is limited opportunity using the circuit of FIG. 1 to provide an energy storing capacitor with significant energy storage capability without introducing a holdover energy circuit component with substantial volume, cost, and reliability issues.

Another circuit arrangement of the prior art is described in Fraidlin, U.S. Pat. No. 5,258,901, which is hereby referenced and incorporated herein in its entirety. Fraidlin describes a power supply with a diode-rectified ac input voltage source and a boost switching regulator that charges a dc bus to a voltage higher than the peak of the input voltage but within the normal voltage range of the load. Fraidlin uses a switching arrangement to charge the holdover capacitor to the bus voltage when the circuit is operating normally, and when holdover power is required, couples the holdover capacitor across the rectified input voltage to allow the boost switching regulator to discharge the holdover capacitor to a relatively low voltage, thereby removing a substantial portion of the stored energy. Nonetheless, the circuit arrangement described by Fraidlin charges the capacitor to a voltage within the normal voltage range of the load, and still requires a capacitor of substantial volume.

In these prior art circuit arrangements the upper range of the holdover capacitor voltage is limited to the upper voltage limit of the load power converter or any particular load voltage to be held up. It is recognized that the energy storage density of electrolytic capacitors, particularly aluminum electrolytics, is higher for capacitors with a higher voltage rating. However, the capacitance of an electrolytic capacitor of a particular volume generally falls as its voltage rating is increased due to the thicker dielectric isolation layer required between the plates of opposite polarity. Illustrated as an example in FIG. 2, is the capacitance of the TS series of aluminum electrolytic capacitors rated from 16 to 450 volts, produced by Panasonic, all of substantially the same physical volume of approximately 490 $cm^3$. As can be seen in the figure, a substantial decrease in capacitance can be observed as the voltage rating is increased.

However, the energy density of higher-voltage rated capacitors generally increases as their voltage rating is increased. Illustrated in FIG. 3 is the energy storage capability of the same Panasonic TS series of capacitors, all of the same physical volume, again plotted as a function of their voltage rating. As can be seen on the figure, a significant increase in stored energy is obtained, and consequently energy density, for the higher voltage rated aluminum electrolytic capacitors. Modest alternations in the monotonicity of plots of energy density vs. voltage rating for a series of aluminum electrolytic capacitors can sometimes be observed, but the general energy density increase with increasing voltage rating is usually obtained.

SUMMARY OF THE INVENTION

In one aspect, the present invention relates to utilizing a bi-directional switching regulator to charge and discharge a holdover capacitor to provide an energy storage element for an electrical load operable over a limited range of input voltages, and which requires a holdover energy source to provide continuity of power within the range of input voltages during power interruptions. By including a bi-directional switching regulator that can charge and discharge a holdover capacitor at a voltage higher than the voltage of the load, a capacitor with greater energy density can be utilized. The design and efficient manufacture of compact, reliable, and low cost powering arrangements for such loads is thereby enabled.

Embodiments of the present invention achieve technical advantages by configuring a holdover circuit to protect an uninterruptible electrical load powered from an input voltage source and operable over a range of input voltages. The holdover circuit is configured with a holdover capacitor charged to a voltage to provide an energy source to power the load during brief power interruptions. The holdover circuit includes a switching regulator coupled between the load and the holdover capacitor including two power switches, and configured to charge and discharge the holdover capacitor at a voltage different from the voltage of the load. Preferably the switching regulator is a boost switching regulator. Preferably, the switching regulator is configured with a controller to maintain the voltage of the holdover capacitor at a voltage higher than the voltage of the load. Preferably, the two power switches in the switching regulator are configured as active switches, and the two power switches are controlled with complementary duty cycles. The controller for the switching regulator may be configured to regulate the holdover voltage of the holdover capacitor at a voltage proportional to the load voltage. Alternatively, controller for the switching regulator may be configured to regulate the holdover voltage of the holdover capacitor to a constant voltage. The controller for the switching regulator preferably produces a duty cycle signal for the switching regulator to regulate the voltage of the holdover capacitor during normal powered operation. The controller for the switching regulator preferably produces a duty cycle signal for the switching regulator to regulate the voltage of the load during holdover operation. Preferably, the controller for the switching regulator is configured to operate in different modes during normal powered operation and during input power interruptions. Preferably, the holdover capacitor is an aluminum electrolytic capacitor.

Embodiments of the present invention achieve technical advantages by configuring a power system that includes a holdover circuit to protect an uninterruptible electrical load powered from an input voltage source and operable over a range of input voltages. The holdover circuit in the power system is configured with a holdover capacitor charged to a voltage to provide an energy source to power the load during brief power interruptions. The holdover circuit includes a switching regulator coupled between the load and the holdover capacitor including two power switches, and configured to charge and discharge the holdover capacitor at a voltage different from the voltage of the load. Preferably, the switching regulator is configured with a controller to maintain the voltage of the holdover capacitor at a voltage higher than the voltage of the load. Preferably, the two power switches in the switching regulator are configured as active switches, and the two power switches are controlled with complementary duty cycles. The controller for the switching regulator may be configured to regulate the holdover voltage of the holdover capacitor to a voltage proportional to the load voltage. Alternatively, controller for the switching regulator may be configured to regulate the holdover voltage of the holdover capacitor to a constant voltage. The controller for the switching regulator preferably produces a duty cycle signal for the switching regulator to regulate the voltage of the holdover capacitor during normal powered operation. The controller for the switching regulator preferably produces a duty cycle signal for the switching regulator to regulate the voltage of the load during holdover operation. Preferably, the controller for the switching regulator is configured to operate in different modes during normal powered operation and during input power interruptions. Preferably, the holdover capacitor is an aluminum electrolytic capacitor.

Another embodiment of the present invention is a method of configuring a holdover circuit to protect an electrical load powered from an input voltage source and operable over a range of input voltages. The method includes configuring the holdover circuit with a holdover capacitor and charging the holdover capacitor to a voltage to provide an energy source to power the load during brief power interruptions. The method includes coupling a switching regulator between the load and the holdover capacitor, including two power switches in the switching regulator so that the holdover capacitor can be charged and discharged at a voltage different from the voltage of the load. Preferably, the method includes configuring the switching regulator to maintain the voltage of the holdover capacitor at a voltage higher than the voltage of the load. Preferably, the method includes configuring the two power switches in the switching regulator as active switches and controlling the switches with complementary duty cycles. The method includes configuring the switching regulator to regulate the voltage of the holdover capacitor at a voltage proportional to the load voltage. Alternatively, the method includes configuring the switching regulator to regulate the holdover voltage of the holdover capacitor at a constant voltage. The method preferably includes configuring the holdover circuit with a controller to produce a duty cycle signal for the switching regulator to regulate the voltage of the holdover capacitor during normal powered operation. The method preferably includes configuring the holdover circuit with a controller to produce a duty cycle signal for the switching regulator to regulate the voltage of the load during holdover operation. Preferably, the method includes configuring the controller for the switching regulator to operate in different modes during normal powered operation and during input power interruptions. Preferably, the method includes utilizing an aluminum electrolytic capacitor for the holdover capacitor.

Embodiments of the present invention achieve technical advantages as a holdover circuit including a switching regulator to charge and discharge a holdover capacitor to produce increased component density and reduced manufacturing cost.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention will be described with respect to preferred embodiments in a specific context, namely a holdover circuit in which a holdover capacitor is reversibly charged and discharged at a voltage higher than the rated voltage of a load. The invention may be applied to a holdover arrangement in which a power converter that operates over a voltage range with an upper and lower input voltage limit is utilized to power a load that may have further voltage limit restrictions.

Figure 4:
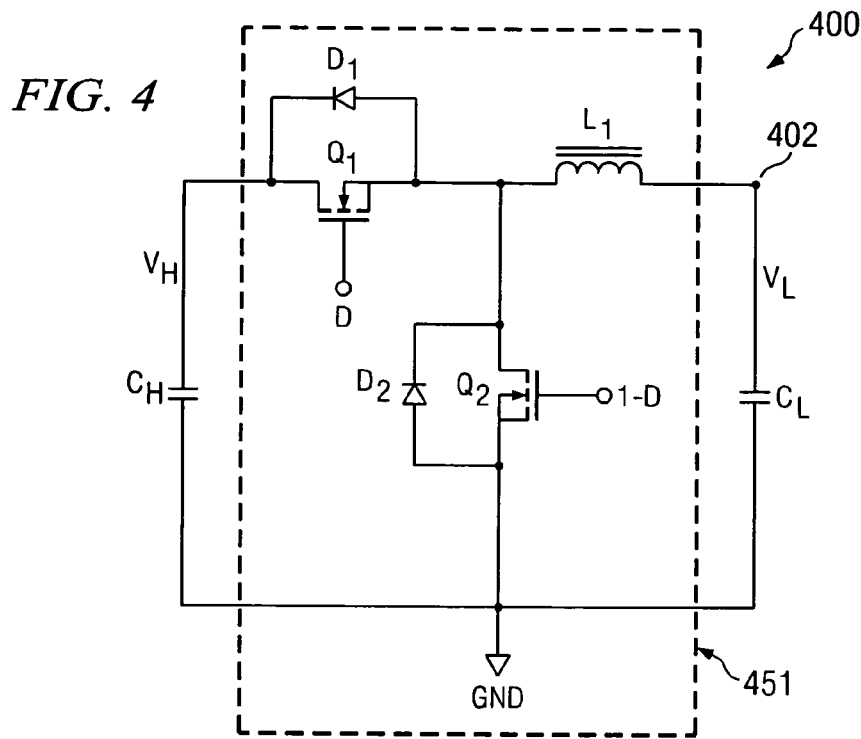
FIG. 4 is a circuit illustrating a boost switching regulator of the present invention, configured to transfer charge in either direction between a low voltage capacitor and a higher voltage capacitor.

Turning now to FIG. 4, illustrated generally in the circuit 400 of the present invention is a switching regulator 451 configured with active switches $Q_2$ for the main switch and $Q_1$ for the freewheeling switch, and boost inductor $L_1$. Both the main switch and the freewheeling switch are shown as FETs with body diodes $D_1$ and $D_2$, but other active switches may alternatively be used. Paralleling diodes may again be added for the switches as necessary if such diodes are not already inherent in the alternative switching devices. An input voltage source (not shown) is coupled to the node 402 and ground, GND.

The switch Q1 is controlled by a controller (not shown) to conduct with a duty cycle D, and the switch $Q_2$ is controlled to conduct with the complementary duty cycle 1-D. By providing active switches for both switching elements in FIG. 4 energy can be transferred either from capacitor $C_L$ to $C_H$, or in the reverse direction, depending on the duty cycle D and the relative voltages across the capacitors $C_H$ and $C_L$. Thus, energy can be reversibly transferred between the capacitors by a switching regulator configured with active switches, ignoring the imperfect energy conversion efficiency of practical switching regulators. In the steady state, the voltages across the capacitors $C_H$ and $C_L$ are related by the duty cycle according to the equation:

$$V_L = V_H \cdot D$$

where VL is the voltage across the capacitor $C_L$, VH is the voltage across the capacitor $C_H$, and D is the duty cycle controlling the freewheeling switch Q1. If the voltage across the capacitor $C_H$ is higher than that indicated by the equation above, then charge will be transferred from the capacitor $C_H$ to the capacitor $C_L$ by the switching regulator 451, and in the reverse direction if the voltage across the capacitor $C_H$ is lower than that indicated by the equation above. Thus, with the circuit arrangement illustrated in FIG. 4, a proportionate voltage ratio can be maintained for the voltages of the two capacitors for a fixed duty cycle D. If the duty cycle is adjustable, then the capacitor voltage ratio can be correspondingly adjusted as described by the equation above. Thus, a circuit has been illustrated that can maintain a voltage of a holdover capacitor that is higher than a voltage of a capacitor that can be coupled across a load, with energy flow in either direction from capacitor to capacitor depending on their relative voltage ratio.

Figure 5:
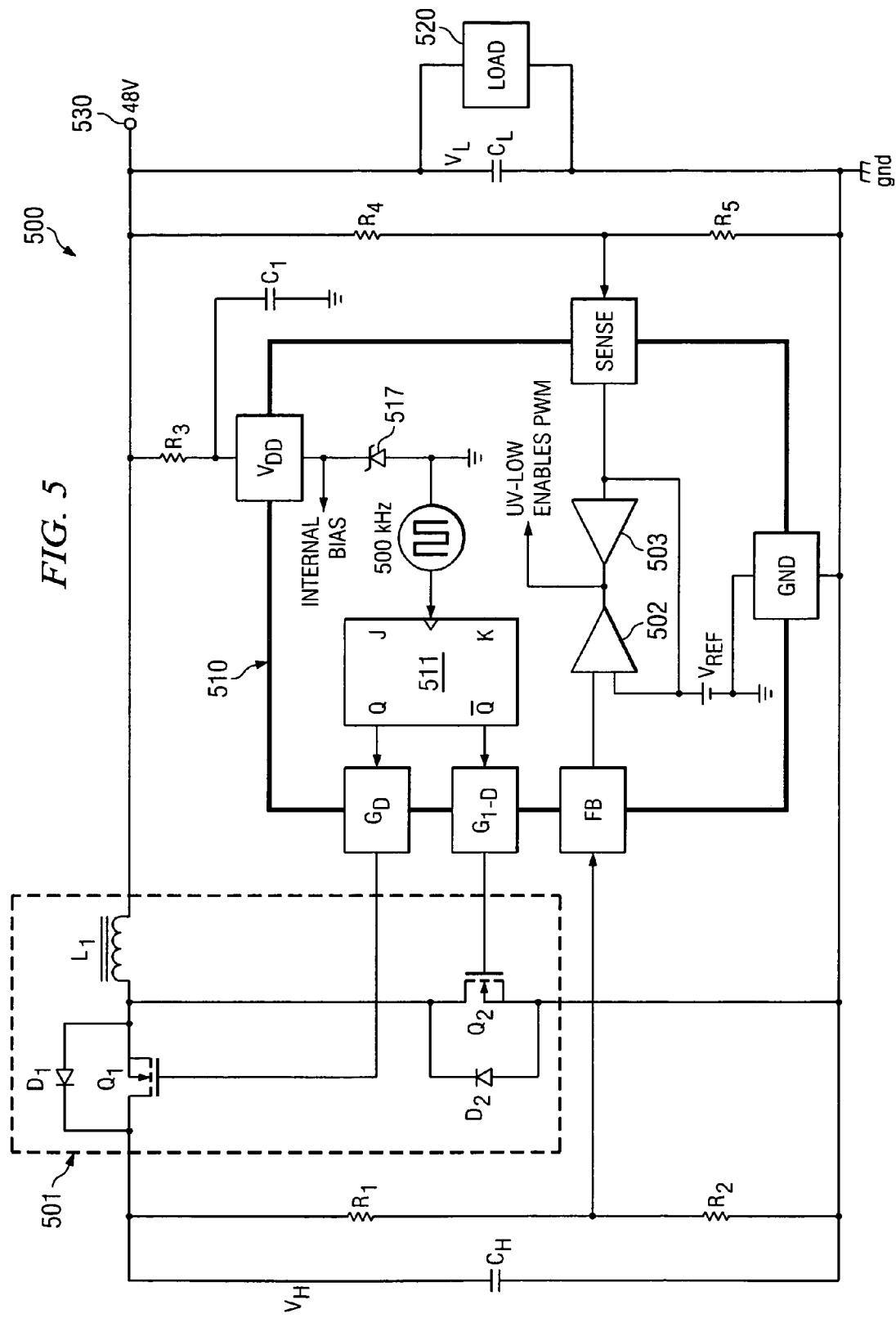
FIG. 5 is a circuit illustrating a holdover circuit of the present invention, configured to utilize a holdover capacitor operating at a higher voltage than the load to be protected, and including a switching regulator operating with a constant duty cycle capable of transferring charge in either direction.

Turning now to FIG. 5, illustrated is a holdover circuit 500 configured according to the present invention, utilizing the circuit illustrated in FIG. 4, to provide power holdover for a load 520. The holdover circuit in FIG. 5 includes a holdover capacitor $C_H$ charged to a voltage higher than the voltage of the load, thereby advantageously utilizing the increased energy storage density of higher-voltage rated aluminum electrolytic capacitors. Use of capacitor technologies other than aluminum electrolytic capacitors is well within the broad scope of the present invention. The load 520 operates over a voltage range with normal upper and lower voltage limits supplied at the 48 V input 530 and the ground terminal gnd, and can operate for brief periods of time such as 5 ms. at a further lower voltage limit that may be several volts below the normal lower voltage limit. The holdover circuit 500 includes the holdover capacitor $C_H$ and preferably also a capacitor $C_L$ coupled in parallel with the load. A switching regulator 501 including active switches $Q_1$ and $Q_2$ with body diodes $D_1$ and $D_2$ is coupled between the capacitors $C_L$ and $C_H$. The switching regulator maintains a voltage ratio for these two capacitors dependent on the duty cycle D and its complement 1-D, as described above, supplied on the terminals $G_D$ and $G_{1-D}$ of the controller 510. The controller 510 provides the duty cycle signals $G_D$ and $G_{1-D}$ with a fixed duty cycle and preferably with a fixed frequency. The controller includes the J-K flip-flop 511 with outputs Q and its complement, triggered by a signal from the 500 kHz oscillator illustrated in the figure. The controller is enabled to operate by internal logic, incompletely shown, that senses the voltages across the capacitors $C_L$ and $C_H$ by the resistor dividers formed by resistors $R_1$ and $R_2$ and by resistors $R_4$ and $R_5$. Logic to enable operation of PWM (pulse-width modulated) controllers is well known in the art and will not be further described. Further, frequency-compensation components to stabilize feedback processes are also well known in the art and will be omitted herein from the drawings and the discussion. The sensed capacitor voltages at the terminals FB and SENSE are compared with reference voltage $V_{REF}$ using comparators 502 and 503, which are preferably open-collector comparators. In the circuit arrangement illustrated, if either comparator senses a low capacitor voltage, the signal UV is generated indicating a capacitor under-voltage condition, enabling the controller to generate a PWM signal to control the switching regulator. If the controller is not enabled by the signal UV, then the controller preferably disables both switches $Q_1$ and $Q_2$ from conducting using logic not shown but also well understood in the art. The internal logic of the controller 510 is powered from the terminal $V_{DD}$ through the resistor $R_3$ and the by-pass capacitor $C_1$. The internal bias voltage is regulated by the Schottky diode 517. The controller is grounded at the terminal GND, which is coupled to circuit ground gnd. A resistor can be included in the circuit illustrated in FIG. 5 (as well as the circuit in FIG. 6) in series with the inductor $L_1$ to limit in-rush current to the capacitor $C_H$ when the circuit is first energized, or other in-rush control arrangements can be used such as the Texas Instruments TPS2393 controller as are well-understood in the art. An integrated driver circuit such as the International Rectifier IR2153 which includes an internal oscillator can optionally be used to provide complementary high- and low-side gate drive signals with controlled dead times for the switches $Q_1$ and $Q_2$.

Figure 1:
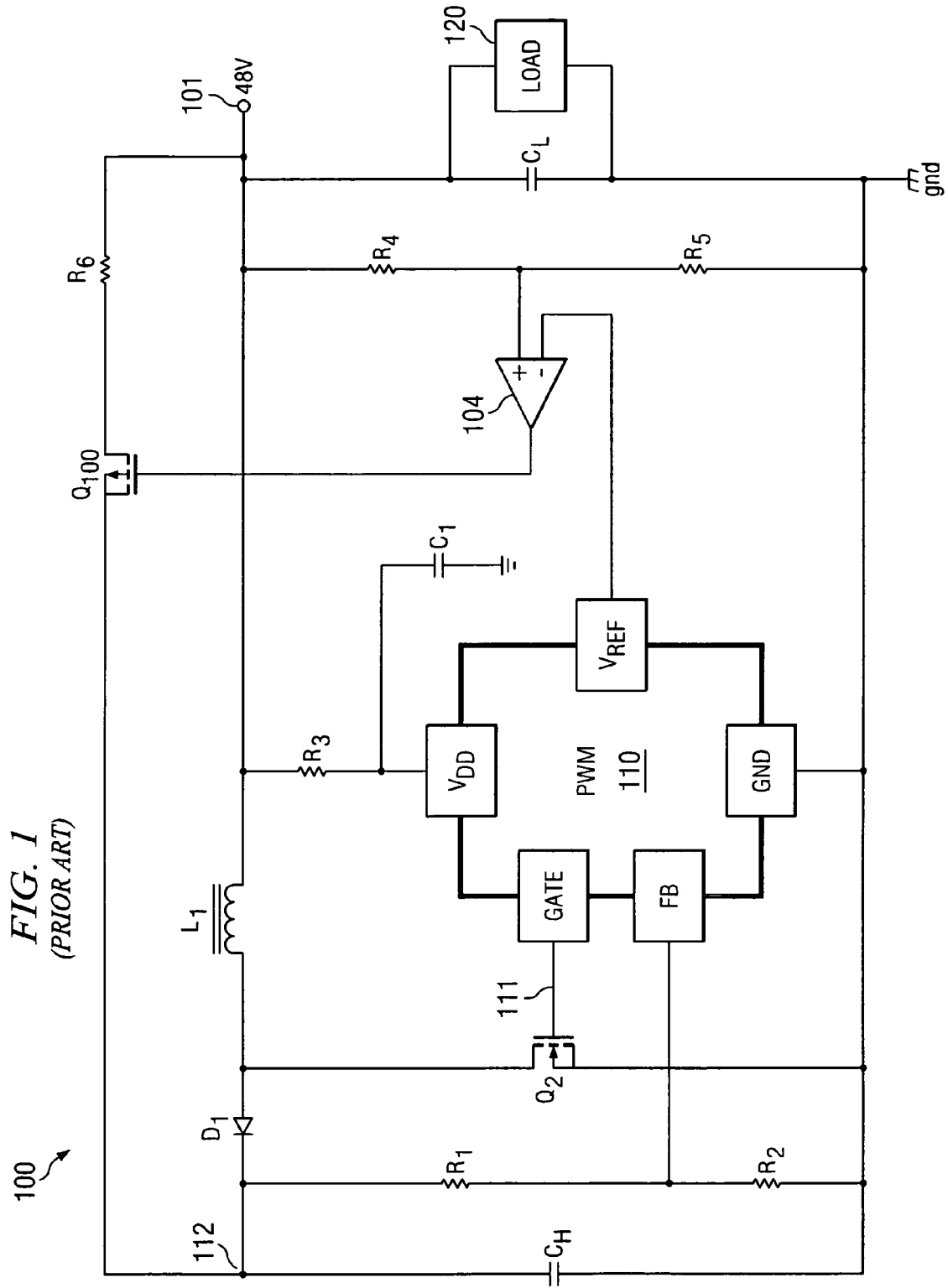
FIG. 1 shows a holdover circuit of the prior art wherein a capacitor is directly coupled to a load to be held over.
Figure 2:
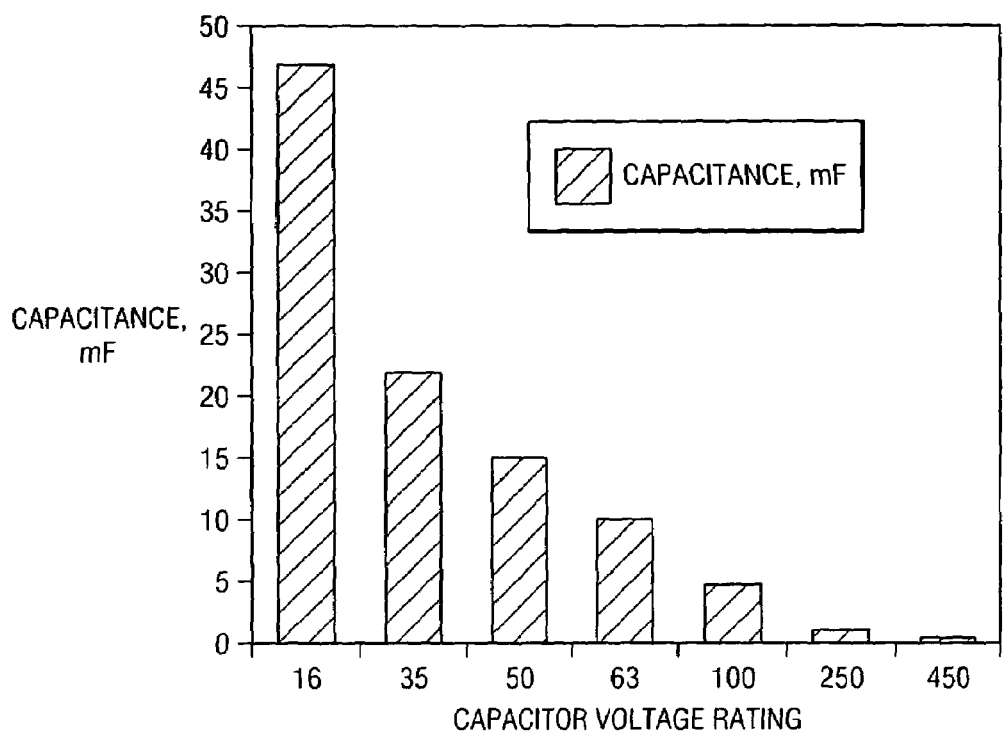
FIG. 2 shows a graph of capacitance of a series of aluminum electrolytic capacitors vs. the corresponding voltage rating.
Figure 3:
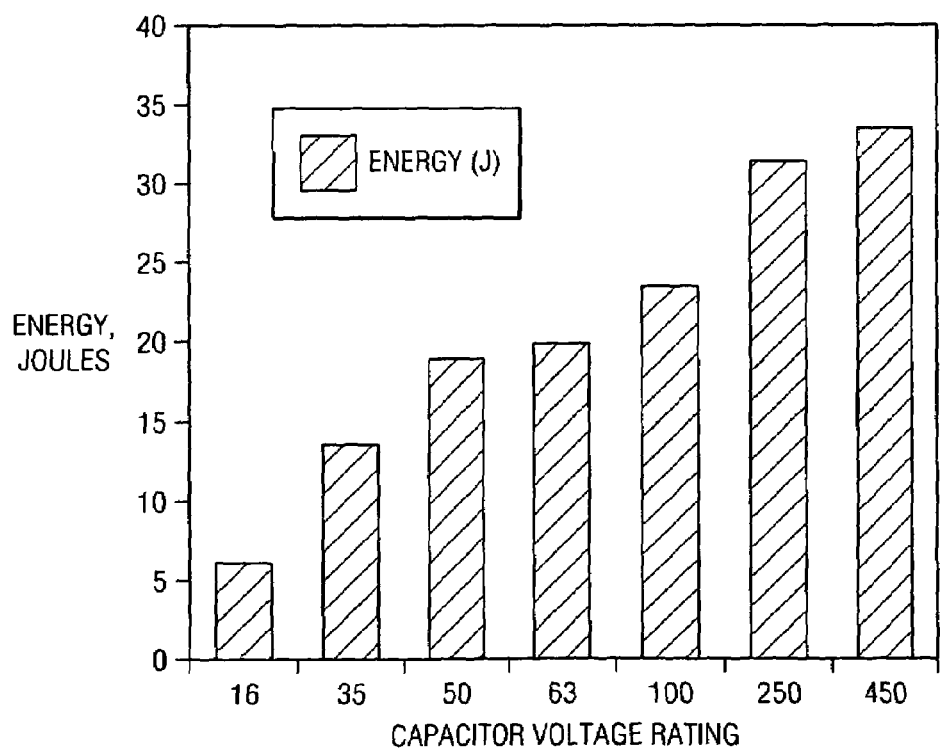
FIG. 3 shows a graph of energy that can be stored in the series of aluminum electrolytic capacitors shown in FIG. 2 vs. voltage rating.

The circuit arrangement illustrated in FIG. 5 thus includes a holdover capacitor $C_H$ that is charged to a voltage that is a multiple of the load voltage to be protected. For example, if the duty cycle of the controller is maintained at 50%, then the voltage across the capacitor $C_H$ is twice the voltage supplied to the load 520. Similarly, as indicated by the equation above relating the capacitor voltage ratio to duty cycle, if the duty cycle is maintained at 40%, then the voltage across capacitor $C_H$ is 2.5 times the voltage supplied to the load 520. Thus the circuit accommodates holdover capacitors that can be charged to higher voltages than can ordinarily be coupled to the load, with an increase in the energy density of the required capacitor and a corresponding reduction in the capacitor size as indicated by the plot in FIG. 3. The duty cycle can also be selected to accommodate the particular voltage ratings of available holdover capacitors.

Figure 6:
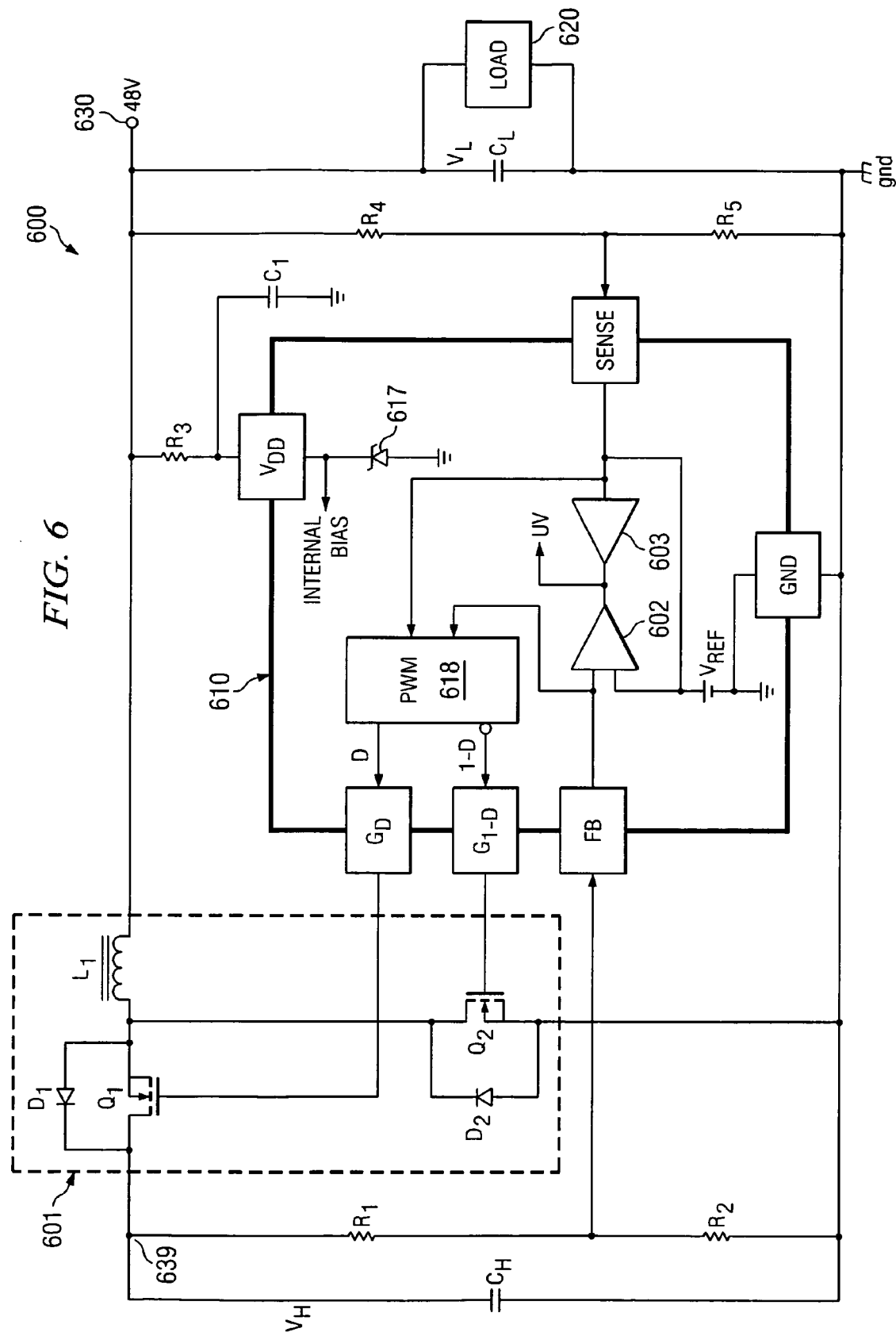
FIG. 6 is a circuit illustrating a holdover circuit of the present invention, configured to utilize a holdover capacitor operating at a higher voltage than the load to be protected, and including a switching regulator capable of transferring charge in either direction while regulating the holdover capacitor voltage or the load voltage.

It is not necessary to control the voltage ratio between the holdover capacitor $C_H$ and the voltage supplied to the load with a fixed duty cycle. Turning now to FIG. 6, illustrated is a holdover circuit 600 of the present invention similar to that in FIG. 5 but including a controller 618 that produces a PWM duty cycle that is selectively dependent on the sensed voltage across the holdover capacitor $C_H$ or the sensed voltage across the load. Elements illustrated in FIG. 6 that are similar to elements in FIG. 5 are indicated with similar last-two numbers in their element identifiers and will not be further described. For example, element 601 in FIG. 6 is similar to element 501 in FIG. 5.

During normal operation when power is continuously supplied to the input terminal 630 the PWM controller 618 operates in a first mode, producing a duty cycle D that is proportional to the voltage across the load, sensed at the terminal SENSE. By such feedforward operation the PWM controller 618 maintains a substantially constant voltage across the capacitor $C_H$. In this manner the capacitor $C_H$ can be charged to a voltage near its voltage rating, thereby storing the maximum energy it is rated to store independent of the actual input voltage supplied to the load. During holdover operation, the PWM controller 618 operates in a second mode producing a duty cycle D that is inversely proportional to the voltage across the capacitor $C_H$, thereby maintaining a substantially constant voltage across the load. The discharge operation of the capacitor $C_H$ can continue until the voltage of both capacitors falls to the lower operating limit for the load. The PWM controller 618 saturates at 100% duty cycle when the capacitor $C_H$ is discharged to the voltage across the load. Internal logic can be included in the design of the controller 618 as is well understood in the art to disable or otherwise modify its operation when limiting voltages or other limiting operating conditions are so obtained.

Figure 7:
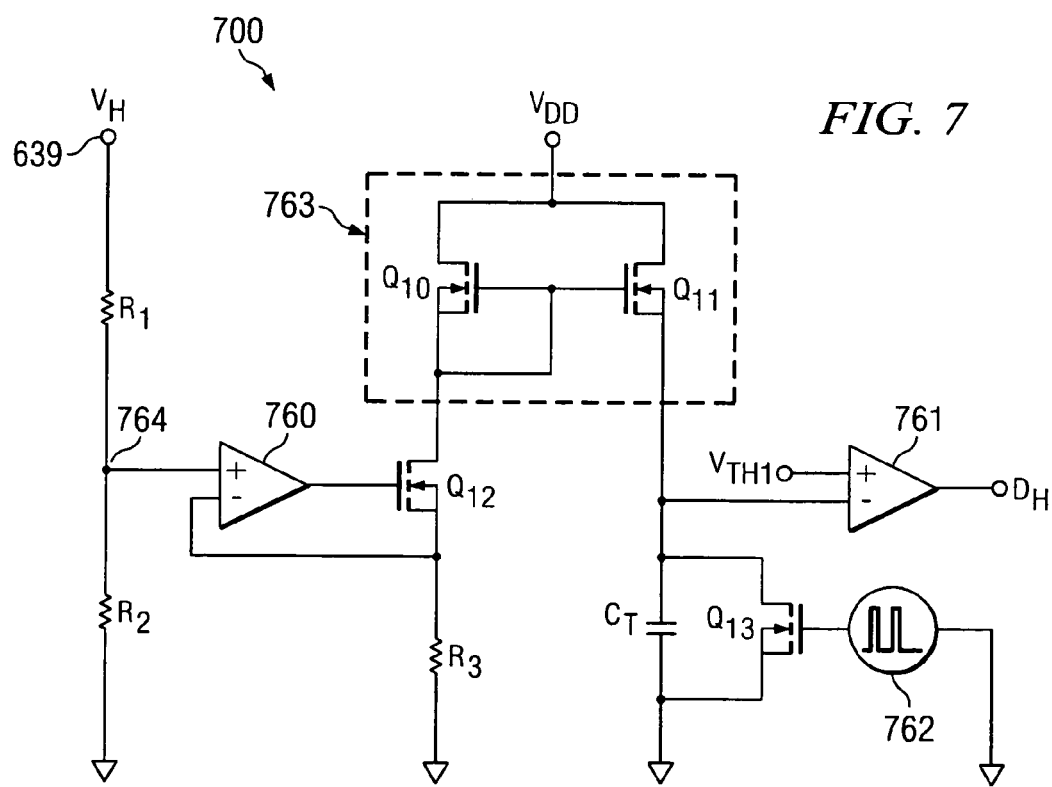
FIG. 7 is a circuit illustrating a controller producing a duty cycle control signal with a duty cycle inversely proportional to a sensed voltage.

Turning now to FIG. 7, illustrated is a simplified PWM control circuit 700 that produces a duty cycle $D_H$ that is inversely proportional to an input voltage $V_H$ such as the voltage across the capacitor $C_H$ illustrated in FIG. 6. The input voltage $V_H$ is sensed at the non-inverting input to the operational amplifier 760 using a resistor divider consisting of the resistors $R_1$ and $R_2$. The output of the operational amplifier 760 is coupled to the gate terminal of the FET $Q_{12}$, whose source is coupled in series with the resistor $R_3$. The source of FET $Q_{12}$ is also coupled to the inverting input of the operational amplifier 760. This results in the voltage across resistor $R_3$ being substantially the same as the sensed voltage at the circuit node 764 between the resistors $R_1$ and $R_2$. The operational amplifier 760 does not significantly load this circuit node, and thus the voltage-dividing ratio of the divider consisting of the resistors $R_1$ and $R_2$ is preserved. This circuit arrangement produces a current into the drain of FET $Q_{12}$ that is proportional to the input voltage sensed at the circuit node 764.

The drain current of FET $Q_{12}$ flows into the current mirror 763 consisting of FETs $Q_{10}$ and $Q_{11}$ and is powered from the bias voltage source $V_{DD}$. Of course, other current mirror configurations are well known in the art such as current mirrors utilizing bipolar transistors and current mirrors that include additional active circuit elements to improve performance and are within the scope of the present invention. The current mirror 763 mirrors this current to charge the capacitor $C_T$, producing a voltage ramp sensed at the inverting input of the comparator 761. When the voltage ramp exceeds the reference voltage $V_{TH1}$ coupled to the non-inverting comparator input, the output of the comparator is driven low. A clock 762, whose frequency is set to the switching frequency of the switching regulator, generates short voltage pulses that are coupled to the gate of FET $Q_{13}$ that periodically cause the capacitor $C_T$ to be discharged. In this manner a duty cycle signal $D_H$ is produced at the output of the comparator 761 that is inversely proportional to the sensed input voltage at the circuit node 764. Other circuit arrangements can be used to produce a duty cycle inversely proportional to an input voltage, or an approximation thereto, and are well within the scope of the present invention.

Figure 8:
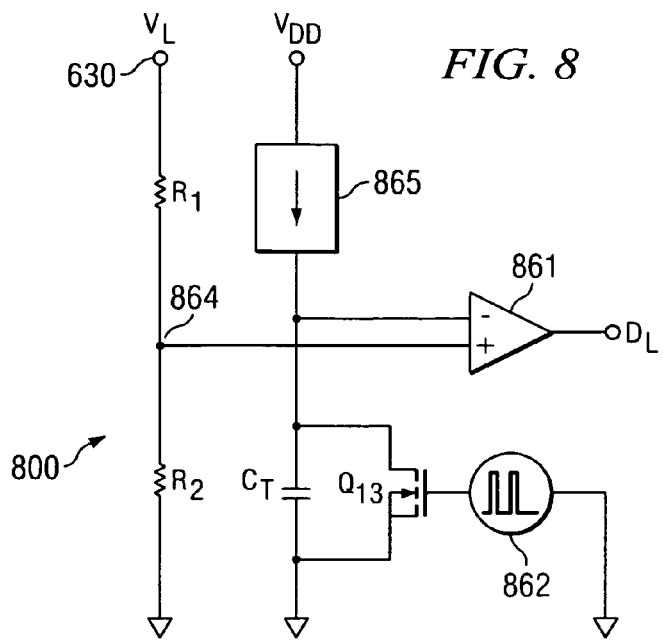
FIG. 8 is a circuit illustrating a controller producing a duty cycle control signal with a duty cycle directly proportional to a sensed voltage.

Turning now to FIG. 8, illustrated is a simplified PWM control circuit 800 that produces a duty cycle $D_L$ that is proportional to an input voltage $V_L$ such as the voltage across the capacitor $C_L$ illustrated in FIG. 6. The input voltage $V_L$ is sensed at the non-inverting input to the operational amplifier 861 using a resistor divider consisting of the resistors $R_1$ and $R_2$. The output of the operational amplifier 861 produces the duty cycle $D_L$. A current source 864 coupled to the bias voltage source $V_{DD}$ produces a current that charges the capacitor $C_T$, producing a voltage ramp sensed at the inverting input of the comparator 861. A clock 862 whose frequency is set to the switching frequency of the switching regulator generates short voltage pulses that are coupled to the gate of FET $Q_{13}$ that periodically cause the capacitor $C_T$ to be discharged. In this manner a duty cycle signal is produced at the output of the comparator 861 that is directly proportional to the sensed input voltage at the circuit node 864. Other circuit arrangements can be used to produce a duty cycle directly proportional to an input voltage, or an approximation thereto, and are well within the scope of the present invention.

Figure 9:
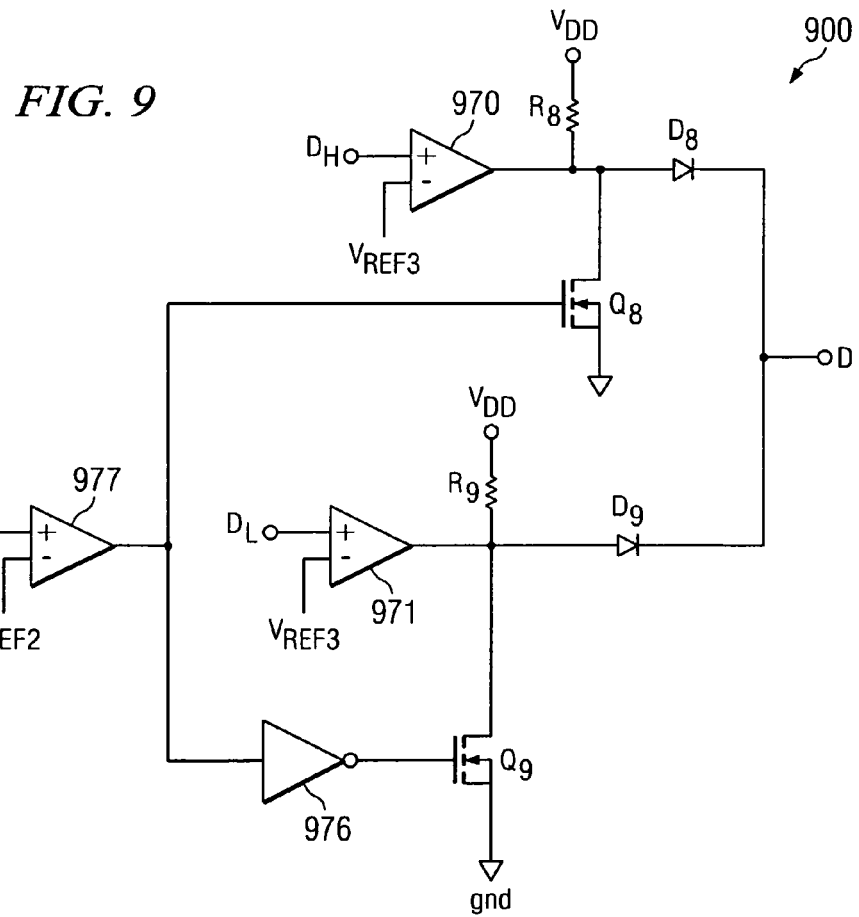
FIG. 9 illustrates a mode control circuit that selectively couples one of two duty cycle control signals to an output based on a sensed input voltage.

FIG. 9 illustrates a mode control circuit 900 that selectively produces an output duty cycle signal D from two duty cycle signals $D_H$ and $D_L$ that may respectively represent duty cycles that are inversely proportional to an input voltage $V_H$ and directly proportional to an input voltage $V_L$, such as are produced by the PWM circuits illustrated on FIGS. 7 and 8. The input voltage that is to be held over is coupled to the node 730, providing 48 volts as an example for the present discussion. The comparator 977 senses this input voltage through the voltage divider consisting of the resistors R4 and R5. If the sensed voltage is above a threshold represented by the reference voltage $V_{REF2}$, then the output of the comparator 977 is driven high. If the output of the comparator 977 is high, then FET $Q_8$ is enabled to conduct, holding the output of comparator 970 low. Preferably, comparator 970 is an open-collector comparator. Otherwise, if the output of the comparator 977 is low, then FET $Q_9$ is enabled to conduct by means of the inverter 976, holding the output of comparator 971 low. Preferably, comparator 971 is also an open-collector comparator. Comparator 970 compares an input duty cycle signal $D_H$ with a reference signal $V_{REF3}$. The voltage level of the reference voltage $V_{REF3}$ is preferably midway between the high or "ON" voltage of the input signals $D_H$ and $D_L$, and ground. When the input duty cycle signal $D_H$ is above the reference $V_{REF3}$, its output is high. Similarly, comparator 971 compares an input duty cycle signal $D_L$ with the reference signal $V_{REF3}$. The comparators illustrated in this and previous figures may include feedback such as resistive feedback from the output to an input to provide hysteresis as is well known in the art. Preferably, such feedback is positive feedback to provide hysteresis. When the input duty cycle signal $D_L$ is above the reference $V_{REF3}$, its output is high. The pull-up resistors $R_8$ and $R_9$ coupled to the bias supply $V_{DD}$ pull the outputs of the open-collector comparators high when their non-inverting inputs are at a higher potential than their inverting inputs. The diodes $D_8$ and $D_9$ provide an OR'ing function, wherein the comparator output with the higher potential is coupled to provide the output signal D. In this manner the circuit 900 provides an output PWM signal based on either of the two duty cycle signals $D_H$ and $D_L$ that are either directly or inversely proportional to input voltages.

Although embodiments of the present invention and its advantages have been described in detail, it should be understood that various changes, substitutions and alterations can be made herein without departing from the spirit and scope of the invention as defined by the appended claims. For example, it will be readily understood by those skilled in the art that the circuits and circuit elements described herein may be implemented using various integrated circuit technologies or may be configured using discrete components while remaining within the scope of the present invention. Similarly, the holdover capacitor technology is not limited to aluminum electrolytic capacitors.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A holdover circuit configured to provide uninterruptible operation during power interruptions, comprising:
    a holdover capacitor charged to a voltage; and
    a bi-directional switching regulator comprising synchronous rectifiers coupled between an electrical load and the holdover capacitor including two power switches each operable with a duty cycle, wherein the bi-directional switching regulator is configured to charge and discharge the holdover capacitor at a voltage different from the voltage of the load for steering energy to and from a high voltage capacitor to reduce the hold-up of the holdover capacitor and wherein the duty cycle is fixed.

2. The holdover circuit according to claim 1, wherein the bi-directional switching regulator is configured to charge the holdover capacitor to a voltage higher than the voltage of the load.

3. The holdover circuit according to claim 1, wherein the bi-directional switching regulator is configured to provide power to the load from the holdover capacitor during power interruptions.

4. The holdover circuit according to claim 1, wherein the power switches are configured as active switches.

5. The holdover circuit according to claim 1, wherein the duty cycles of the power switches are complementary.

6. The holdover circuit according to claim 1, wherein the bi-directional switching regulator includes a controller to regulate the voltage of the holdover capacitor at a voltage proportional to the load voltage.

7. The holdover circuit according to claim 1, wherein the bi-directional switching regulator includes a controller to regulate the voltage of the holdover capacitor at a substantially constant voltage.

8. The holdover circuit according to claim 1, wherein the holdover capacitor is an aluminum electrolytic capacitor.

9. The holdover circuit according to claim 1, wherein the bi-directional switching regulator includes a controller that operates in different modes during normally powered operation and during power interruptions.

10. A method of configuring a holdover circuit to provide uninterruptible operation during power interruptions, comprising:
    charging a holdover capacitor to a voltage; and
    coupling a bi-directional switching regulator comprising synchronous rectifiers between an electrical load and the holdover capacitor including two power switches each operable with a duty cycle and configuring the bi-directional switching regulator to charge and discharge the holdover capacitor at a voltage different from the voltage of the load for steering energy to and from a high voltage capacitor to reduce the hold-up of the holdover capacitor and wherein the duty cycle is fixed.

11. The method according to claim 10, including configuring the bi-directional switching regulator to charge the holdover capacitor at a voltage higher than the voltage of the load.

12. The method according to claim 10, including configuring the bi-directional switching regulator to provide power to the load from the holdover capacitor during power interruptions.

13. The method according to claim 10, including configuring the power switches as active switches.

14. The method according to claim 10, including controlling the power switches with complementary duty cycles.

15. The method according to claim 10, including configuring a controller for the bi-directional switching regulator to regulate the voltage of the holdover capacitor at a voltage proportional to the load voltage.

16. The method according to claim 10, including configuring a controller for the bi-directional switching regulator to regulate the voltage of the holdover capacitor at a substantially constant voltage.

17. The method according to claim 10, wherein the holdover capacitor is an aluminum electrolytic capacitor.

18. The method according to claim 10, including configuring a controller for the bi-directional switching regulator to operate in different modes during normally powered operation and during power interruptions.

* * * * *